United States Patent [19]

Lynn

[11] 4,041,992
[45] Aug. 16, 1977

[54] WIRE TIGHTENING DEVICE

[76] Inventor: Paul R. Lynn, 1302 N. Tennessee Blvd., Murfreesboro, Tenn. 37130

[21] Appl. No.: 717,399

[22] Filed: Aug. 24, 1976

[51] Int. Cl.² .............................................. B21F 9/00
[52] U.S. Cl. .................................. 140/123.5; 24/71.3; 140/102.5
[58] Field of Search ...................... 24/71.1, 71.2, 71.3; 256/37, 40; 140/52, 69, 102.5, 106, 123.5, 117, 118

[56] References Cited

U.S. PATENT DOCUMENTS

| 526,718 | 10/1894 | Leyner | 140/102.5 |
| 3,568,261 | 3/1971 | Korb | 24/71.3 |

FOREIGN PATENT DOCUMENTS

| 1,273,289 | 5/1972 | United Kingdom | 140/123.5 |

Primary Examiner—Lowell A. Larson
Attorney, Agent, or Firm—Cushman, Darby & Cushman

[57] ABSTRACT

A wire tightening device particularly for use with barbed wire fences, with a link formed from a cylindrical rod and having one end portion bent at substantially 60° relative to the main body portion and another end portion bent substantially 90° relative to the main body portion and substantially 90° counter clockwise from the plane containing the bend of the first end portion and also having a further bend of 20° in this end portion in the same plane as and 90° clockwise to, the 90° bend of this end portion; a first handle formed from a cylindrical rod and having one end ending in a truncated right cylindrical portion with a hole extending through the intersection of the truncated surface and the cylindrical surface and through the axis of the rod, through which hole the one end of the link can be removably inserted; a second, L-shaped handle formed from a rectangular bar with a hole defined in the foot portion and another hole defined in the leg portion adjacent the foot portion so that the link may be removably inserted in either hole so that when the two handles are in place the link may be rotated about the wire so as to cause the wire to be wrapped thereupon.

7 Claims, 6 Drawing Figures

WIRE TIGHTENING DEVICE

BACKGROUND OF THE INVENTION

1. Field of the Invention

This invention relates to wire tightening devices, and more particularly, to a wire tightening device in which a member remains captive by the wire.

2. Prior Art

Many ways have been proposed for tightening wire, particularly for tightening barbed wire used to enclose large areas of pasture land for cattle and the like. Some of these devices require very expensive and complicated tools which are utilized to take up the slack in the wire so that a clamp of some sort can be applied to the wire to maintain the wire taut once the tools are removed. Other such devices utilized for tightening wire have relatively complicated and expensive link members which are left on the wire once it has been tightened.

Because such prior art devices require the use of these expensive tools to apply the link members or for actually tightening the wire, they are not practical for persons who only wish to tighten a small expanse of wire since they are not cost effective. Also, because, as mentioned above, many of the link members themselves are very expensive, the use of large numbers of links for tightening wire between adjacent fence posts over large areas of land is likewise prohibitive.

SUMMARY OF THE INVENTION

The present invention provides an uncomplicated and relatively inexpensive means of tightening wire, particularly barbed wire and other such wire used to fence in large ranges of land.

The present invention basically comprises a link member with one end portion bent at substantially 60° relative to the main body portion thereof and another end portion which is bent at substantially 90° relative to the main body portion and substantially 90° counter clockwise from the plane containing the first bend, and a further bend in this same other end portion of substantially 20° in the same plane as, and 90° clockwise to, the 90° bend of this end portion; a first handle with a hole defined through one end portion thereof with a diameter sufficient to permit one end portion of the link member to be inserted therein and extend through the first handle so as to be removably disposed thereon; and a second handle having an L-shaped end portion with a hole defined in the foot portion thereof and having a diameter sufficient to permit the other end portion of the link member to be inserted therein and extend through the foot portion so as to be removably disposable thereon.

It is further preferable to have the link member formed from a circular rod of a greater diameter than the wire which is to be tightened and of sufficient strength to permit the member to retain its form while the wire is being drawn taut by wrapping around the link member as the handles are rotated to thus rotate the link member. It is also preferable to have the first mentioned handle formed from a cylindrical rod and with an end portion which is formed into a truncated right cylindrical portion with the hole passing through the junction of the truncated surface and the cylindrical surface at an oblique angle to the axis of the rod and through the axis of the rod. This construction is of assistance in the tightening operation in that it permits the link to be rotated about the barbed wire by the second handle without interference between the end portion of the first handle and the wire or the link member.

The second mentioned handle also preferably has a second hole formed in the leg portion thereof adjacent the foot portion so that if the wire to be tightened is in a difficult-to-get-at place it is possible to move the tool into a different position by removing it from the link and placing the other hole on the link and continuing to rotate the link. The second handle is also preferably formed of flat bar-stock of rectangular cross-section.

Once the link has been entwined in the wire due to the rotation of the second handle, and the wire has been tightened in this manner, the first handle is moved towards the second handle to bend the link over the wire, thus, locking it in position so that the wire cannot unwrap and there is no back up from the desired tautness. The handles can then be removed from the link member and the 90° bend in the link member and the bend put into it after the wire is taut will prevent the wire from unwrapping.

DETAILED DESCRIPTION OF THE PREFERRED EMBODIMENT

Figure 1:
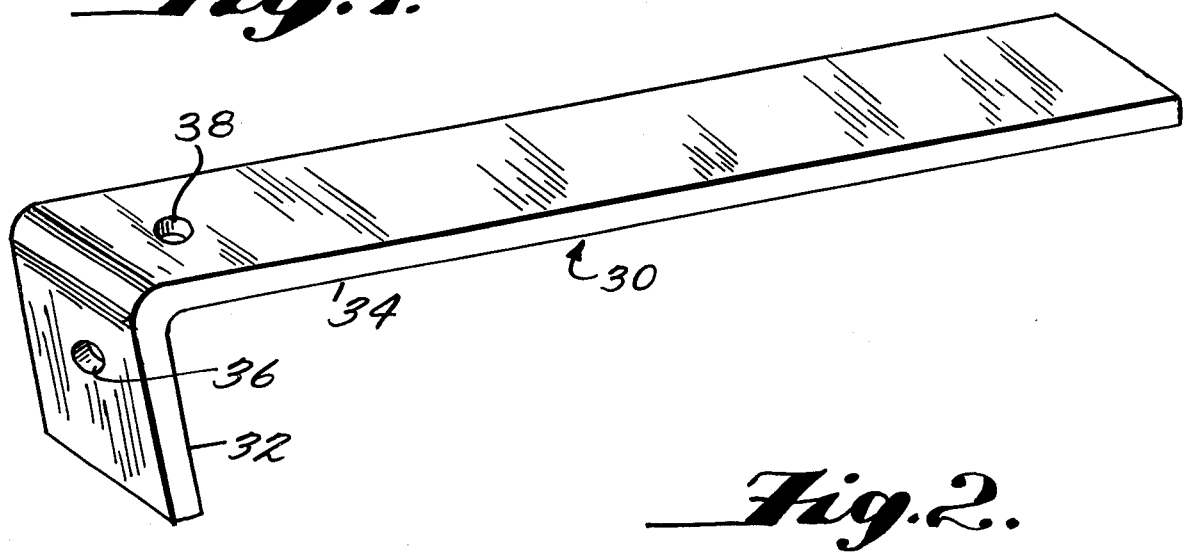
FIG. 1 is a perspective view of the second handle means of the preferred embodiment of the present invention.

The link member 10, illustrated in FIGS. 3 through 6, is preferably formed from a piece of cylindrical steel rod of sufficient strength to permit the wire which is to be tightened, to be wrapped about the link member without the link member deforming during the wrapping operation. Prior to the link member 10 being engaged with the wire it is formed with a plurality of bends. A first end portion 12 of the link member 10 is bent at 60° relative to the main body portion 14. Another end portion 16 is bent at 90° relative to the main body portion 14 and in a plane 90° counter clockwise from the plane containing the end portion bent at 60°. The other end portion 16 is again bent at 20° at its outermost end portion 18; the 20° being measured from the plane containing and 90° clockwise to, the end portion 16 other than the portion 18. This is to hold the second handle member, described below, on the link member 10 as it is rotated about the wire. Putting the concave portion of the bend against the force exerted by the second handle member prevents the second handle member from slipping off the link member. This bending operation is preferably done on a mass production basis so that the links are readily available for use at the time the wire is to be tightened.

Although the exact angle at which the link is bent is not particularly important, the basic shape and position of the angles on each end of the link is important and should be maintained at the approximate angles mentioned.

Figure 2:
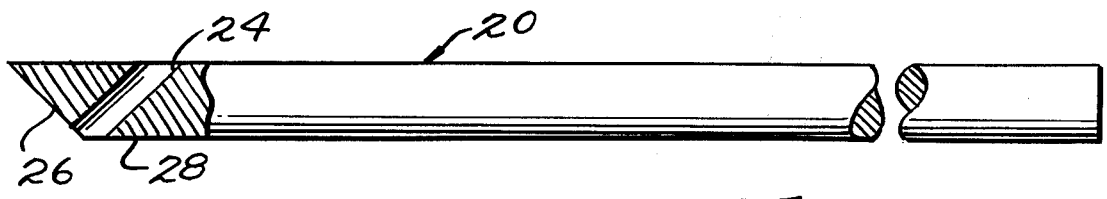
FIG. 2 is a side plan view of the first handle means of the preferred embodiment of the present invention.
Figure 3:
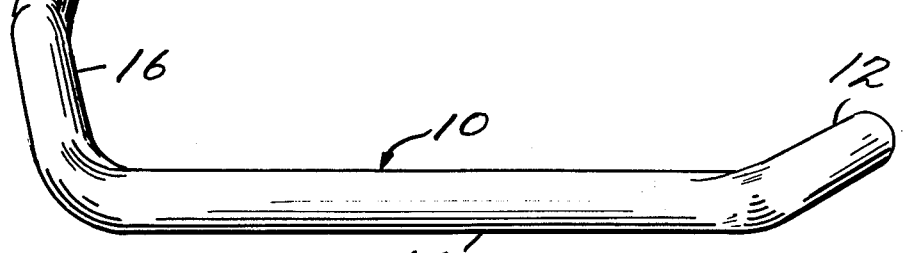
FIG. 3 is a perspective view of the link means of the preferred embodiment of the present invention.

The first handle member 20, illustrated in FIG. 2, is also preferably formed from cylindrical steel rod, but of a greater diameter than the steel rod from which the link member 10 is formed so as to provide additional strength for applying leverage during the winding operation as will be discussed more fully below. One end portion 22 of the first handle member 20 preferably ends in a truncated right cylindrical portion with a hole 24 extending therethrough and passing through the juncture of the truncated surface 26 and the cylindrical surface 28 at an angle oblique to the axis of the second handle member 20 and through the axis and out of the opposite side of the first handle member. The truncated surface 26 also preferably makes an angle of 45° with the axis of the handle member 20.

Again, although the angle of the hole 24 relative to the axis of the first handle member 20 is not particularly critical, it should be maintained at a slightly oblique angle from the axis of the first handle 20 in order to insure a proper grip by the handle member on the link member during the tightening operation so that the handle member will not slip from the link member.

The second handle member 30, illustrated in FIG. 1, is preferably of an L-shaped configuration with a foot portion 32 an leg portion 34, and is preferably formed from flat steel bar stock. A hole 36 is formed in the foot portion 32 and a further hole 38 is formed in the leg portion 34 adjacent the foot portion. Both holes 36 and 38 are drilled through the respective portions of the second handle member 30, perpendicular to the planes containing the respective portions. The holes 36 and 38 are of sufficient diameter to permit the end portion 16 of link member 10 to be inserted in either hole depending upon which position the second handle member 30 is to be placed in during use.

When the preferred embodiment according to the present invention is utilized for tightening of barbed wire or the like, it has been found advantageous to form the link member 10 from 3/16ths bar stock approximately 3 inches long. The first end portion 12 is bent so that it is approximately a quarter of an inch in length and the second end portion 16 is bent so that it is approximately 11/16ths of an inch long and the 20 bend is then made at approximately a half inch from the main body portion 14 of the link member so that the ends of the outmost end portion 18 of end portion 16 is approximately 3/16ths of an inch long. The first handle member 20 is preferably formed of half-inch circular steel rod and the hole 24 is preferably 7/32nds of an inch in diameter and the rod should be approximately 12 inches in length. The second handle member 30 is preferably formed from 3/16ths of an inch flat steel bar stock of 1 inch width, with the foot portion 32 approximately an inch and a half in length and a leg portion 34 approximately 7 inches in length with the holes 36 and 38 being 7/32nds in diameter.

Figure 6:
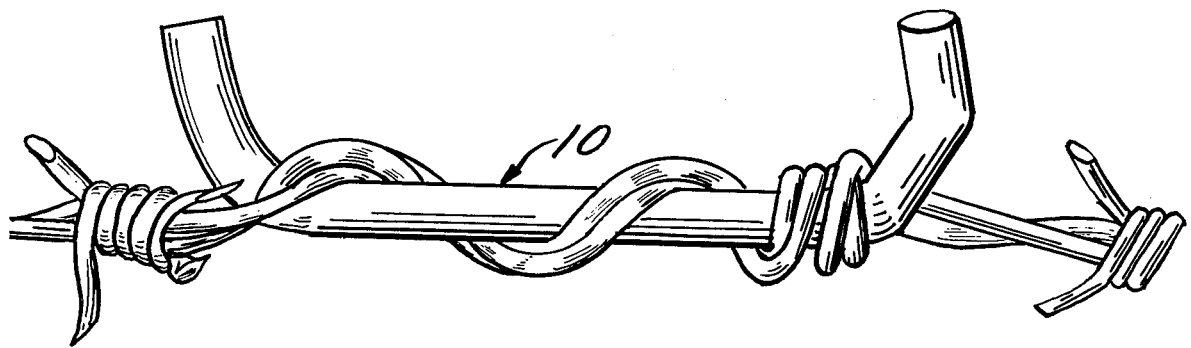
FIG. 6 is a perspective view of link member of the preferred embodiment as applied to a length of barbed wire and with the handles removed.
Figure 4:
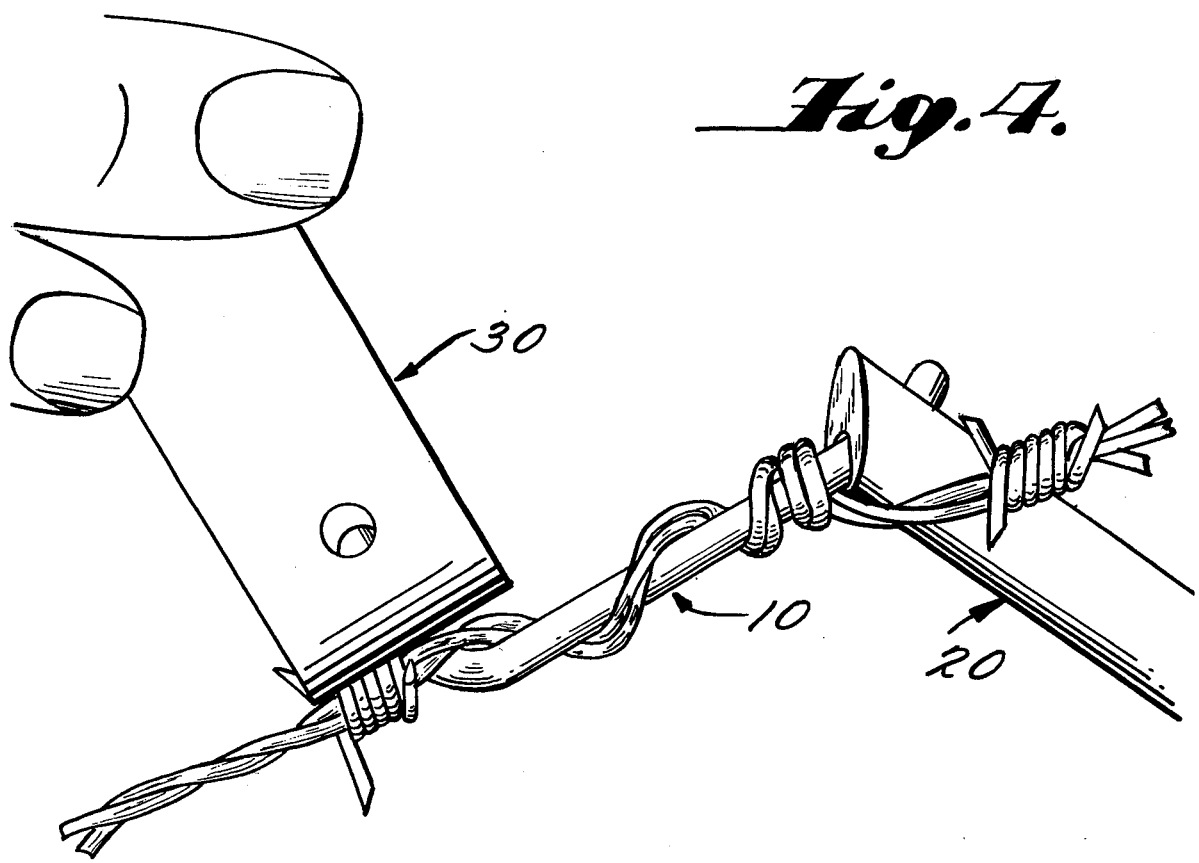
FIG. 4 is a perspective view illustrating the preferred embodiment of the present invention applied to a length of barbed wire fence.
Figure 5:
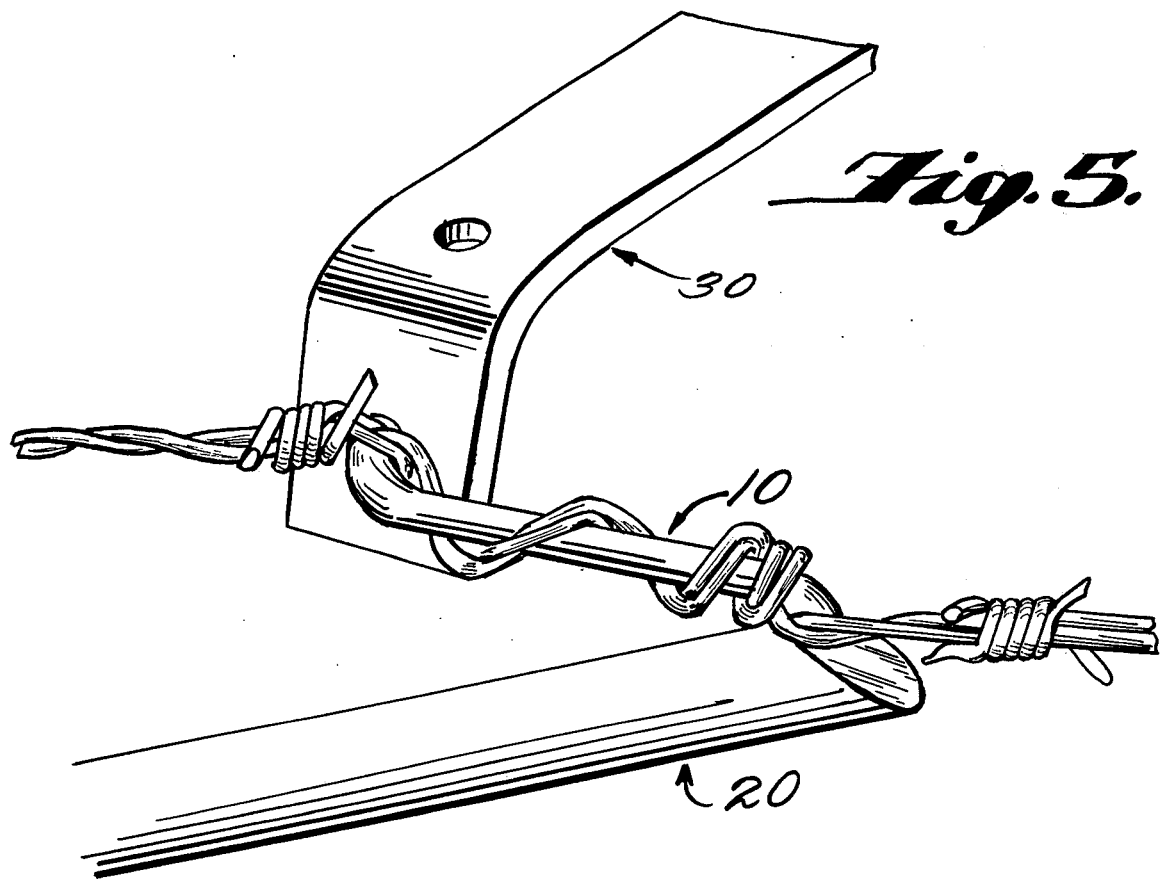
FIG. 5 is a further perspective view of the preferred embodiment from a position different than that illustrated in FIG. 4.

In use, the link is placed upon the barbed wire as illustrated in FIGS. 4 through 6 with the first handle member 20 positioned on the end portion 12 of the link member 10 and the second handle member 30 positioned on the end portion 16 of the link member. The handle member 30 is then rotated while handle member 20 is held in a stationary position, so as to cause the barbed wire to wrap about the link member 10 thus, shortening the length of barbed wire between two adjacent posts and as a result, causing the barbed wire to tighten.

If the link member 10 is placed on a piece of wire in a position in which the handle member 30 cannot be rotated in a circular path without encountering an obstruction, the handle member 30 has been provided with a second hole 38 so that the handle member 30 may be repositioned on the end portion 16 of link member 10 when the obstacle is encountered and thus permit the link member 10 to be rotated under such conditions. This permits the link member 10 to be placed on the barbed wire when, for example, there is another string of barbed wire immediately adjacent the one being tightened. With the dimensions of the embodiment referred to above, this permits a wire to be tightened with another wire at least as close as 2 inches to the wire being tightened.

Once the wire has been tightened to the desired degree, the handle member 20 is moved towards the handle member 30 to bend the end portion 12 of link member 10 over the wire, thus, locking it in position so that the wire cannot unwrap and there is no back-up from the desired tautness. To remove the handle members from the link member the first handle member 20 is rotated so that the angle of the link member is in the same position it was in when inserted into the first handle member 20 so that the handle member can easily removed from the link member. The second handle member 30 can be removed from the link member 10 without rotating it.

Although the preferred embodiment has been referred to and illustrated as being used for tightening barbed wire, naturally, many other types of wire, such as woven wire or brace wire, can also be tightened in the manner discussed above.

Further, with the dimensions of the link referred to above, it has been shown that any degree of looseness from 0 to 3 inches in a wire may be removed by using this link and wrapping the barbed wire approximately 6 times around the link. Naturally, if additional slack must be removed from a wire between two adjacent fence posts, additional links may be used. Also, the link is preferably made from galvanized steel so as to prevent rust an increase the life of the link.

Although the foregoing description illustrates the preferred embodiment of the present invention, it will be obvious to those skilled in the art that variations are possible. All such variations as would be obvious to one skilled in this art are intended to be included within the invention as defined by the following claims.

I claim:

1. A wire tightening device comprising:
    link means with one end portion bent at substantially 60° relative to a main body portion and another end portion bent at substantially 90° relative to the main body portion and substantially 90° counter clockwise from the plane containing the bend of said one end portion, said other end portion having a further bend of substantially 20° in the same plane as and 90° clockwise to, the 90° bend in the other end portion;
    first handle means having a hole defined through one end portion thereof with a diameter sufficient to permit the one end portion of the link means to be inserted therein and extend through the first handle means so as to be removably disposable thereon; and second handle means having an L-shaped end portion with a hole defined in the foot portion thereof and having a diameter sufficient to permit the other end portion of the link means to be inserted therein and extend through the foot portion so as to be removably disposable thereon.

2. A wire tightening device as defined in claim 1 wherein the link means is a circular rod having a diameter greater than the diameter of a wire to be tightened.

3. A wire tightening device as defined in claim 2 wherein the first handle means is a circular rod having the one end portion ending in a truncated right circular cylinder and the hole defined therein passing through the juncture of the truncated surface and the cylindrical surface at an oblique angle to the axis of the rod and through the axis of the rod.

4. A wire tightening device as defined in claim 3 wherein the second handle means has another hole defined in the leg portions thereof adjacent the foot portion, the other hole having the same diameter as the hole in the foot portion.

5. A wire tightening device as defined in claim 4 wherein the second handle means is a flat bar of substantially rectangular cross-section.

6. A wire tightening device as defined in claim 5 wherein the hole and the other hole defined in the second handle means both extend through the second handle means perpendicular to the length of the foot and leg portions respectively and have intersecting axes.

7. A wire tightening device as defined in claim 3 wherein the truncated surface of the first handle means makes an angle of substantially 45° to the axis of the rod.

* * * * *